Patented Sept. 23, 1924.

1,509,355

UNITED STATES PATENT OFFICE.

CYRUS HOWARD HAPGOOD, OF NUTLEY, NEW JERSEY, ASSIGNOR TO THE DE LAVAL SEPARATOR COMPANY, OF NEW YORK, N. Y., A CORPORATION OF NEW JERSEY.

PROCESS OF REFINING SUGAR-CANE JUICE.

No Drawing.    Application filed May 7, 1921.   Serial No. 467,529.

*To all whom it may concern:*

Be it known that I, CYRUS HOWARD HAPGOOD, a citizen of the United States, residing at Nutley, county of Essex, and State of New Jersey, have invented a new and useful Improvement in Processes of Refining Sugar-Cane Juice, of which the following is a full, clear, and exact description.

Raw sugar cane juice contains fibrous organic material which is bacteria-propagating and which rapidly acidifies the juice. When raw sugar cane juice is allowed to stand for any substantial length of time it becomes rancid and spoilt. Hence it is necessary to evaporate the juice before acidification sets in. The impurities, however, remain in the raw sugars and their elimination adds materially to the expense of refining.

The object of my invention is to eliminate the specified impurities, as well as any dirt or other contaminating matter, from sugar cane juice in order, first, that it may be kept for a substantial time without deterioration where conditions are such as to make it inconvenient to immediately evaporate it; second, that the raw sugar itself will be purified so that when sold as such, it will be superior in purity to commercial brown sugar; third, that the refining process may be simplified by the omission of such part of the treatment as is now required to eliminate the impurities that are present in normal refined sugar.

The practice of my process involves two known principles, namely: centrifugal force and the sludging out of the solid impurities (which are of higher specific gravity than the juice) by means of an added cushioning liquid of heavier specific gravity than the liquid to be purified, which added liquid may or may not be of greater specific gravity than the impurities.

The application of these principles involves the selection of a cushioning liquid that is not only relatively heavy, but that is not miscible with the sugar cane juice (otherwise the two would go into solution and solutions cannot be broken by centrifugal force) and that will not impart to the sugar cane juice any disagreeable properties, such as impairment of flavor. No such liquid is available on the market.

My invention involves the conception of forming an artificial or compound liquid composed of two liquids, miscible with each other, neither of which has the qualities required for a cushioning liquid, but which, when mixed in appropriate proportions, forms a solution that possesses the required properties. Thus I have been able to provide a cushioning liquid which possesses the qualities desired, including a specific gravity which corresponds precisely to the ideal specific gravity sought, by forming a solution of carbon tetrachloride and paraffine. Paraffine oil is a liquid which is not miscible with sugar cane juice and which will not impart to the juice any foreign property, but its specific gravity (about .9) is below that of the juice (about 1.02). Carbon tetrachloride has a specific gravity (about 1.64) much above that of the cane juice and is not miscible with the juice, but it imparts a disagreeable flavor to the juice and its specific gravity is altogether too high. While neither of these two liquids is miscible with sugar cane juice, they are miscible with each other. Again, these two liquids may be mixed in proportions to give any desired specific gravity to the solution. Finally, I have discovered that a solution of carbon tetrachloride and paraffine does not impart any disagreeable flavor to the sugar cane juice.

In carrying out the process, it is not desirable to mix the added compound liquid, or heavy solution, with the sugar cane juice before subjecting the same to centrifugation, but it is permissible to admit all the ingredients into the centrifuge without making a special effort to maintain them out of contact. Thus the compound liquid and the cane juice may be fed separately into the regulating cover of the centrifuge. Preferably, the compound liquid is fed separately into the centrifuge at the periphery of the bowl so that there will be no contact between it and the juice except where the two liquid zones merge.

The effect of centrifugation is to cause all the impurities to be projected against the wall of heavy liquid at the periphery of the bowl and to be thereby carried out of the bowl with such liquid.

As a specific example, I prefer to form a solution of about five parts or slightly more of paraffine oil with two parts of carbon tetrachloride, thereby giving a solution of a specific gravity of about 1.11. This density is such as to allow the penetration of the solution by the impurities, whereby they are carried off. The percentage of the compound liquid to the sugar cane juice will vary from ten to twenty per cent dependent upon the condition of the juice. I may carry out the process in a centrifuge of the type shown in the Snyder Patent No. 1,283,343, dated October 29, 1918, which is especially adapted to the separation of a heavy liquid and solid impurities from a light liquid, as, for example, the purification of gasoline and lubricating oil, by the removal from it of water, dirt, etc. I prefer, however, to utilize a centrifuge provided with means to convey the heavier compound liquid separately and directly to the periphery of the bowl. A good type of such a centrifuge is shown in the Hall Patent No. 1,411,782, April 4, 1922.

Sugar cane juice treated by my process will keep for a long time without spoiling. The raw sugar resultant from evaporation is a distinctly higher grade of "brown sugar" than has heretofore been marketed. Its refinement to one of the grades of "white sugar" is simplified by the lack of necessity for removing the impurities specified during the refining process.

Any other liquids, including any oil of mineral, vegetable or animal origin that is not miscible with cane juice and that will not impart thereto any disagreeable properties, may be substituted for paraffine oil. Other liquids of high specific gravity that are miscible with the lighter added liquid and that are not miscible with cane juice and that will not, when dissolved in the lighter added liquid, impart any disagreeable properties to the cane juice, may be substituted for carbon tetrachloride. In stating specific ingredients in the claims, I mean to include equivalents.

It is clear, also, that the invention, while novel as applied to the purification of sugar can juice, is also, in a broader aspect, adaptable to the purification of other liquids than sugar cane juice; that is, to that class of liquids containing solid or semi-solid impurities which heretofore could not be centrifugally purified because no other liquid was available to act as an agent for sludging out such impurities.

Having now fully described my invention, what I claim and desire to protect by Letters Patent is:

1. The process of purifying sugar cane juice by removal therefrom of ingredients whose retention promotes deterioration which comprises subjecting the same and a solution of carbon tetrachloride and paraffine oil to centrifugal force, the proportions of the ingredients of the solution being such that the solution has a specific gravity greater than that of the juice, separately floating off the juice, and eliminating the impurities with the solution.

2. The process of purifying sugar cane juice by removal therefrom of ingredients whose retention promote deterioration which comprises forming a solution of paraffine oil and carbon tetrachloride having a higher specific gravity than the cane juice, and subjecting the cane juice and the solution to centrifugal force.

3. In the process of eliminating, from a liquid, solid or semi-solid impurities of higher specific gravity by means of centrifugal force in conjunction with a cushioning liquid, the process which comprises taking a liquid heavier than the liquid to be purified and mixing therewith another liquid lighter than the liquid to be purified and that forms with the heavier liquid a solution immiscible with and non-contaminative of the liquid to be purified, the proportions of the liquids being such as to provide a solution of higher specific gravity than the liquid to be purified, subjecting the liquid to be purified and the solution to centrifugal force and continuously flowing off the purified liquid.

In testimony of which invention, I have hereunto set my hand, at Philada., Penna., on this 5th day of May, 1921.

CYRUS HOWARD HAPGOOD.